(12) United States Patent
Nagane et al.

(10) Patent No.: US 10,658,635 B2
(45) Date of Patent: May 19, 2020

(54) BATTERY PACK AND VEHICLE EQUIPPED WITH SAME

(71) Applicant: SANYO Electric Co., Ltd., Osaka (JP)

(72) Inventors: Takeshi Nagane, Miyagi (JP); Yasushi Hirakawa, Osaka (JP)

(73) Assignee: SANYO ELECTRIC CO., LTD., Osaka (JP)

( * ) Notice: Subject to any disclaimer, the term of this patent is extended or adjusted under 35 U.S.C. 154(b) by 485 days.

(21) Appl. No.: 15/522,319

(22) PCT Filed: Jul. 7, 2015

(86) PCT No.: PCT/JP2015/003404
§ 371 (c)(1),
(2) Date: Apr. 27, 2017

(87) PCT Pub. No.: WO2016/084272
PCT Pub. Date: Jun. 2, 2016

(65) Prior Publication Data
US 2017/0352850 A1    Dec. 7, 2017

(30) Foreign Application Priority Data

Nov. 28, 2014 (JP) .................................. 2014-241927

(51) Int. Cl.
*H01M 2/10* (2006.01)
(52) U.S. Cl.
CPC ...... *H01M 2/1077* (2013.01); *H01M 2220/20* (2013.01)
(58) Field of Classification Search
CPC ................ H01M 2220/20; H01M 2/1077
See application file for complete search history.

(56) References Cited

U.S. PATENT DOCUMENTS

| 2007/0026305 A1* | 2/2007 | Jeon | H01M 2/1077 429/159 |
| 2010/0297486 A1* | 11/2010 | Fujii | H01M 10/625 429/120 |

(Continued)

FOREIGN PATENT DOCUMENTS

| JP | 2015-207553 | 11/2015 |
| WO | 2010/131700 | 11/2010 |

OTHER PUBLICATIONS

International Search Report of PCT application No. PCT/JP2015/003404 dated Sep. 8, 2015.

*Primary Examiner* — Lingwen R Zeng
(74) *Attorney, Agent, or Firm* — Wenderoth, Lind & Ponack, L.L.P.

(57) ABSTRACT

A battery pack including a lightweight and high-rigidity end plate is provided. The battery pack includes: cell stacked body including a plurality of stacked rectangular cells; first end plate disposed at one end of cell stacked body in the stacking direction of rectangular cells; second end plate disposed at the other end of cell stacked body; and connection member connected to first end plate and second end plate. At least one of first end plate and second end plate includes first member made of a first metal material and second member made of a second metal material different from the first metal material. First member and second member are stacked in the stacking direction of rectangular cells. The rigidity of the second metal material is higher than that of the first metal material. The specific gravity of the first metal material is lower than that of the second metal material.

15 Claims, 15 Drawing Sheets

(56) References Cited

U.S. PATENT DOCUMENTS

2012/0052359 A1    3/2012  Yoshitake et al.
2017/0110695 A1    4/2017  Nishikawa et al.

* cited by examiner

BATTERY PACK AND VEHICLE EQUIPPED WITH SAME

This application is a U.S. national stage application of the PCT International Application No. PCT/JP2015/003404 filed on Jul. 7, 2015, which claims the benefit of foreign priority of Japanese patent application 2014-241927 filed on Nov. 28, 2014, the contents all of which are incorporated herein by reference.

TECHNICAL FIELD

The present invention relates to a battery pack in which a plurality of cells are stacked and endplates are disposed at the opposite ends, and to a vehicle equipped with the battery pack.

BACKGROUND ART

In a battery pack including a plurality of stacked cells, the output voltage can be increased by interconnecting the cells in series, the output current can be increased by interconnecting the cells in parallel. Therefore, the battery pack having this structure is used as a power source of a large output and a large capacity, for example, as a power source device for a vehicle. In the battery pack having this structure, a cell stacked body is grasped with end plates at its opposite ends and is firmly fixed. The end plates fixed in a state where the cells are pressurized require a robust structure. When the cells swell due to the charge and discharge, a high pressure acts on the end plates. The end plates not only must have a high rigidity, but also must be lightweight without being thickened. That is because heavy end plates increase the weight of the battery pack and thick end plates increase the size of the battery pack. In the battery pack, the charge/discharge capacity per unit weight and unit volume can be increased by decreasing the weight and thickness of the end plates. This characteristic is extremely important in all applications of the battery pack. For example, this characteristic in a battery pack mounted in a vehicle improves the fuel consumption of the vehicle, and allows the battery pack to be mounted in a small installation space.

An end plate is produced by molding a resin or by molding or cutting a metal. However, a resin-made end plate can be made lightweight but cannot obtain a high rigidity. Disadvantageously, a metal-made end plate can obtain a high rigidity but cannot be made lightweight.

Patent Literature 1 discloses an end plate formed of a metal plate and a resin plate.

CITATION LIST

Patent Literature

PTL 1: International Patent Publication No. 2010/131700

SUMMARY OF THE INVENTION

An end plate disclosed by Patent Literature 1 is an extremely lightweight end plate, but has an insufficient rigidity. Therefore, the development of a lightweight and high-rigidity end plate is demanded.

An important objective of the present invention is to provide a battery pack including a lightweight and high-rigidity end plate, and a vehicle equipped with the battery pack.

A battery pack in one aspect of the present invention includes the following the elements:
a cell stacked body including a plurality of stacked rectangular cells;
a first end plate disposed at one end of the cell stacked body in the stacking direction of the rectangular cells;
a second end plate disposed at the other end of the cell stacked body in the stacking direction of the rectangular cells; and
a connection member connected to the first end plate and the second end plate.

At least one of the first end plate and the second end plate includes a first member made of a first metal material and a second member made of a second metal material different from the first metal material. The first member and second member are stacked in the stacking direction of the rectangular cells. The rigidity of the second metal material is higher than that of the first metal material. The specific gravity of the first metal material is lower than that of the second metal material.

In the above-mentioned battery pack, a cell expansion reaction force generated by the cell stacked body due to the charge or discharge of the cells is received by the end plate including the first member and second member. Thus, the rigidity in the cell stacking direction can be increased, and the extension of the battery pack in the cell stacking direction can be reduced. Especially in the case that the thickness of the end plates is restricted by a limited dimension restriction, compared with a conventional end plate made of a single member, an end plate including the first member and second member has the following advantages:

the rigidity of the end plate can be increased while the weight increase is suppressed; and the extension of the battery pack in the cell stacking direction can be reduced.

In a metal end plate that is formed of a single member and has a high rigidity, the extension in the cell stacking direction can be suppressed, but the weight is increased. In a metal end plate that has a low rigidity and is lightweight, the weight can be reduced, but the extension cannot be suppressed. While, in the above-mentioned battery pack, an end plate is formed by stacking, in the cell stacking direction, the first member made of the first metal material having a low specific gravity and the second member made of the second metal material having a high rigidity. Therefore, the extension of the battery pack in the cell stacking direction can be suppressed without causing the weight increase.

The second member can be disposed between the first member and a cell stacked body.

In this structure, the first member that has a low rigidity and a high degree of freedom in shape during the molding is disposed on the outside. Therefore, the processing for fixing a connection member, and the processing for fixing the first member to a base plate can be easily applied to the first member disposed on the outside. Here, the base plate is a fixing portion of a vehicle or base.

The thickness of the first member in the stacking direction of the rectangular cells can be set greater than that of the second member in the stacking direction of the rectangular cells.

In this structure, the first member that constitutes an end plate and is made of the first metal material having a low specific gravity is thickened, and the second member made of a heavy second metal material having a high rigidity is thinned. Therefore, a high rigidity can be achieved without causing an excessive weight increase, and the extension in the cell stacking direction can be certainly suppressed. By increasing the thickness of the first member, the degree of freedom in shape can be further increased, and molding and processing of a recess or through hole required for connection or fixation can be applied to the first member in an ideal state.

The first member includes, on its surface facing the second member, an engagement recess with which the second member is to be engaged, and the second member can be stacked on the first member by being engaged with the engagement recess.

In this structure, the second member is engaged with the engagement recess that is disposed in the surface of the first member facing the second member. Therefore, the first member and the second member are stacked in an engagement structure, and can be connected to fixed positions without thickening the end plate.

The first member and the second member can be pasted on and fixed to each other using an adhesive or a tape having adhesive layers on its opposite surfaces.

In this structure, the first member and the second member are integrally fixed to each other by adhesion. The rigidity of the end plate is the sum of the rigidities of the first member and the second member, so that the rigidity of the end plate is further improved. In a manufacturing process, by fixing the first member and the second member to each other, the end plate can be handled in an integrally coupled state and the manufacturing can be facilitated.

The first member can include a through hole, and the second member can include a through hole at a position facing the through hole of the first member.

In this structure, the first member and the second member can be connected to fixed positions by positioning the second member and the first member via the through holes.

The first member can be made of aluminum or an aluminum alloy, and the second member can be made of iron or an iron alloy.

In the above-mentioned battery pack, by stacking the aluminum of the first member and the iron or an iron alloy of the second member, the end plate can be made lightweight and highly rigid.

A reinforcing rib can be disposed in the second member by folding an end of the second member. Thus, the bending strength of the second member can be increased and the strength of the end plate can be increased. Preferably, the first member includes a recess at a position facing the reinforcing rib of the second member, and the reinforcing rib of the second member is disposed in the recess. Thus, the rigidity of the end plate can be increased without thickening the end plate. Preferably, the reinforcing rib is disposed at at least one of the upper edge and the lower edge of the second member. More preferably, the reinforcing rib is disposed at the upper edge and the lower edge of the second member.

The second member includes a fitting projection on its surface facing the first member, the first member includes a fitting recess in its surface facing the second member, and the fitting projection on the second member can be disposed in the fitting recess in the first member.

In the above-mentioned battery pack, the fitting projection is disposed on the second member, and hence the second member can be reinforced to increase the rigidity. The fitting recess is disposed in the first member, and hence the first member can be made lightweight. Furthermore, the fitting projection on the second member is disposed in the fitting recess in the first member, so that the first member and the second member can be disposed at the fixed positions. The increase in thickness of the end plate can be suppressed.

The following structure may be employed:

a connection member is fixed to the first member via a fixing component, the first member includes a through hole into which the fixing component is inserted; and the second member includes a through hole on the extension of the through hole in the first member, and a caulked portion of the fixing component is disposed inside the through hole in the first member.

Thus, the increase in the length of the battery pack in the cell stacking direction can be suppressed. Preferably, a rivet is used as the fixing component. More preferably, a blind rivet is used. In the case that the fixing component is a rivet, when the second member includes a through hole on an extension of the through hole in the first member, the rivet does not interfere with the second member even when the length of a part to be caulked in the rivet is increased. Therefore, the length of the part to be caulked in the rivet can be increased, and the caulked portion after caulking of the rivet can be enlarged. Therefore, the connection member can be firmly fixed to the first member by caulking.

The connection member is disposed on a side surface or an upper surface of the cell stacked body. One end of the connection member in the stacking direction of the rectangular cells includes a first fixing portion that is folded so as to follow the outer surface of the first end plate. The other end of the connection member in the stacking direction of the rectangular cells includes a second fixing portion that is folded so as to follow the outer surface of the second end plate. The first fixing portion can be fixed to the outer surface of the first end plate, and the second fixing portion can be fixed to the outer surface of the second end plate. The shape of the connection member is not especially limited. For example, the connection member may be formed in a bar shape, a plate shape, or a block shape. When the connection member is formed in a plate shape, the end in the width direction may be folded along the cell stacking direction.

The vehicle of the present invention is equipped with any one of the above-mentioned battery packs.

DESCRIPTION OF EMBODIMENT(S)

Hereinafter, examples of the present invention are described with reference to the accompanying drawings. The following examples show battery packs for embodying the technical ideas of the present invention. The present invention is not limited to the following battery packs. In the present invention, members shown in the scope of claims are not limited to the members of the examples.

A battery pack shown in the following example is optimum for a power source of an electric vehicle such as a hybrid car or plug-in hybrid car that travels using both an engine and a motor, an electric car travelling using only a motor, or an electric motorcycle travelling using a motor. However, the battery pack of the present invention is available also for applications requiring a large output other than the electric vehicle, for example, is available as a power source for an electric storage device.

Figure 1:
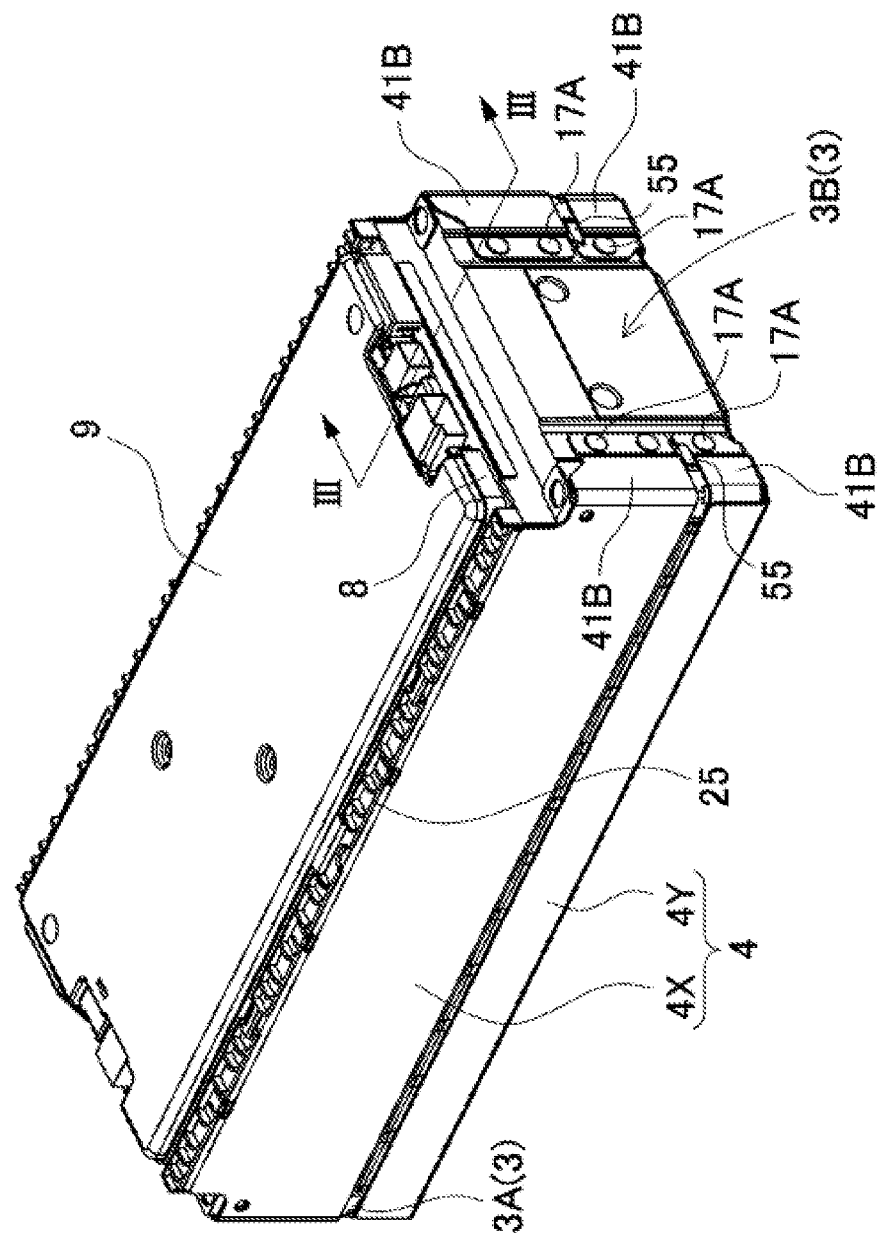
FIG. 1 is a perspective view of a battery pack in accordance with one exemplary embodiment of the present invention.
Figure 2:
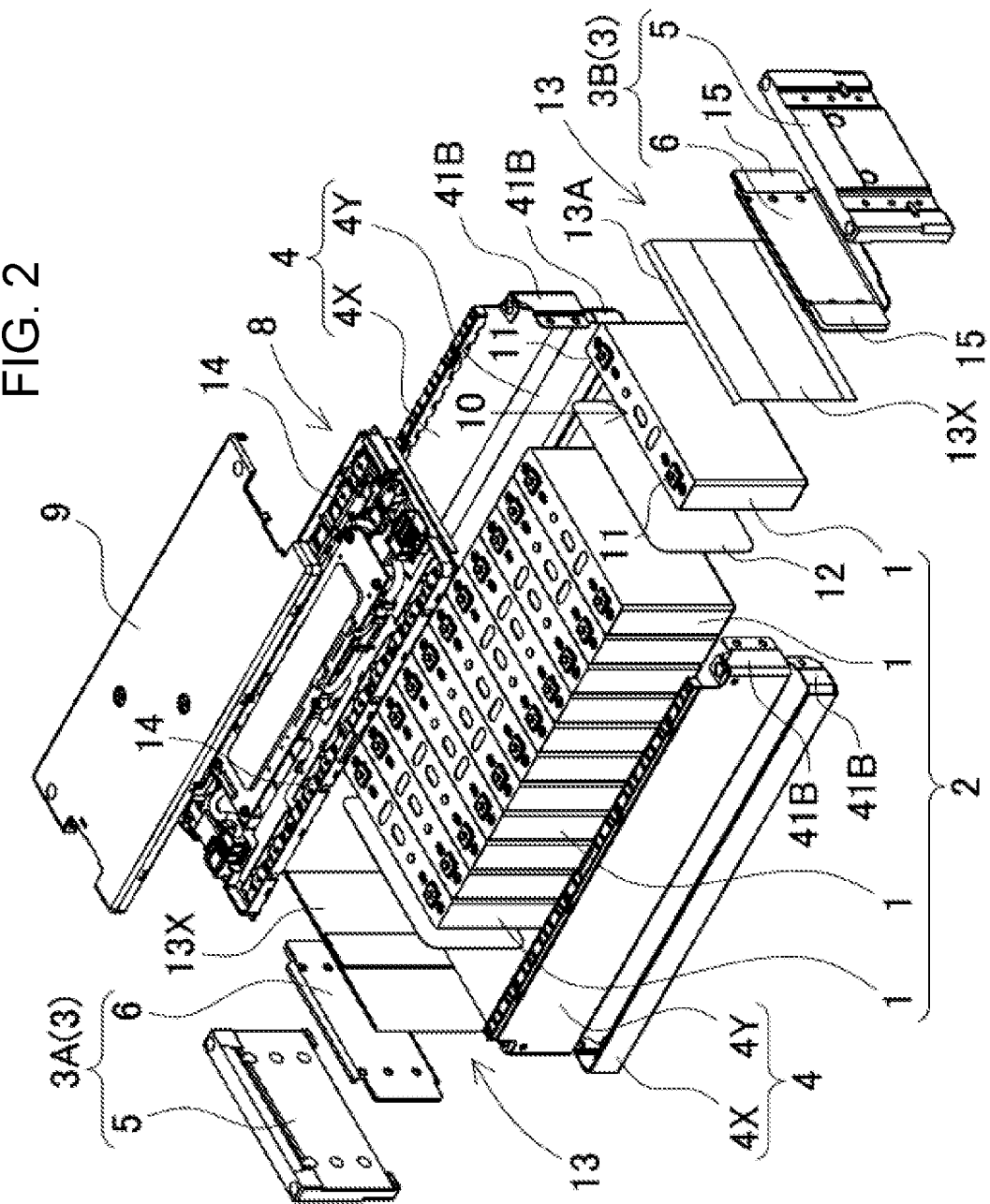
FIG. 2 is an exploded perspective view of the battery pack shown in FIG. 1.

A battery pack shown in FIG. 1 and FIG. 2 includes the following elements:

cell stacked body 2 formed by stacking a plurality of rectangular cells 1 in the thickness direction;

metal-made end plates 3 disposed at the opposite ends of cell stacked body 2 in the stacking direction of rectangular cells 1; and connection member 4 connected to end plates 3 disposed at the opposite ends of cell stacked body 2.

(Rectangular Cell 1)

As shown in FIG. 2, each rectangular cell 1 is a secondary cell whose width is greater than the thickness—namely, the cell is thinner than its width—, and cell stacked body 2 is formed by stacking rectangular cells 1 in the thickness direction. Rectangular cells 1 are lithium-ion secondary cells. However, the rectangular cells may include all of chargeable secondary cells such as nickel-metal-hydride cells and nickel-cadmium cells. In each rectangular cell 1, positive and negative electrode plates, together with an electrolytic solution, are stored in an exterior can having a sealed structure. The exterior can is formed by pressing a metal plate made of aluminum or an aluminum alloy into a rectangular shape, and its opening is air-tightly sealed by a sealing plate. The sealing plate is made of aluminum or an aluminum alloy similarly to the exterior can, and fixes positive and negative electrode terminals 11. Positive and negative electrode terminals 11 are set in the state where at least one electrode terminal 11 is insulated from the sealing plate. Rectangular cell 1 includes positive and negative electrode terminals 11 and terminal surface 10 as the sealing plate. In rectangular cell 1, the bottom surface and side surfaces of the exterior can are covered with an insulating film.

A plurality of rectangular cells 1 are stacked so that the stacking direction is the same as the thickness direction of each rectangular cell 1, thereby forming cell stacked body 2. In each rectangular cell 1, one outer peripheral surface of the rectangle is used as terminal surface 10 having positive and negative electrode terminals 11. The plurality of rectangular cells 1 are stacked so that terminal surfaces 10 are disposed on the same plane, thereby forming cell stacked body 2.

(Cell Stacked Body 2)

Figure 3:
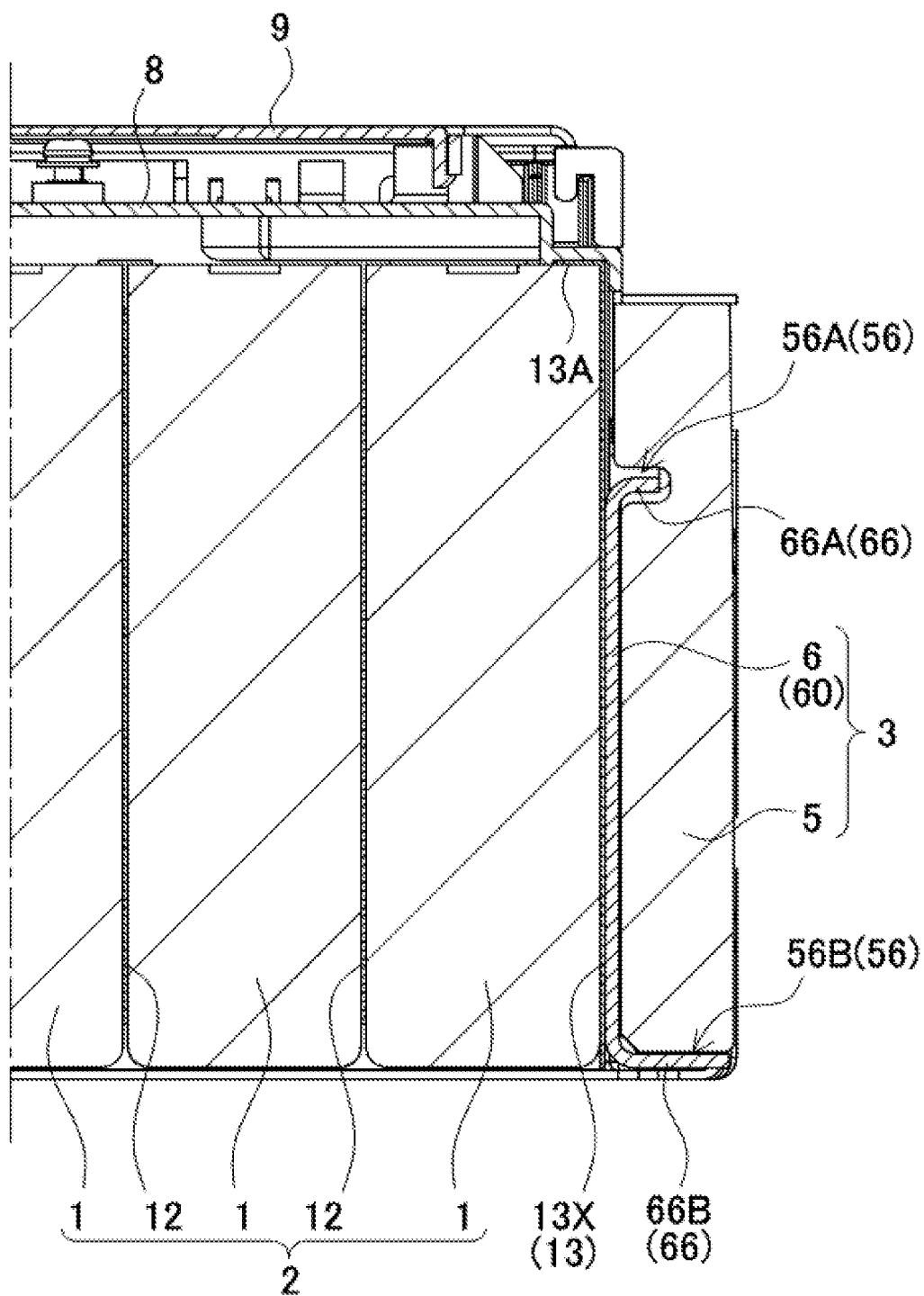
FIG. 3 is a sectional view taken along line III-III on the battery pack shown in FIG. 1.

In cell stacked body 2, as shown in FIG. 2 and FIG. 3, insulating spacers 12 are grasped between stacked rectangular cells 1. Each insulating spacer 12 in the drawings is made of an insulating material such as a resin, and is formed in a thin plate shape or a sheet shape. Each insulating spacer 12 in the drawings has a plate shape having a size substantially equal to that of the opposed surface of rectangular cell 1. Insulating spacer 12 is disposed between adjacent rectangular cells 1, and insulates the adjacent rectangular cells 1 from each other. As the spacer to be disposed between adjacent rectangular cells 1, a spacer having a shape allowing a flow channel of cooling gas to be formed between rectangular cells 1 and the spacer can be employed.

In cell stacked body 2, metal-made bus bar 14 is connected to positive and negative electrode terminals 11 of adjacent rectangular cells 1, and bus bar 14 interconnects the plurality of rectangular cells 1 in series, in parallel, or in series and in parallel. In cell stacked body 2 shown in the drawings, 12 rectangular cells 1 are interconnected in series. The present invention limits neither the number of rectangular cells constituting the cell stacked body nor the connection state thereof.

Bus bar 14 includes a connection portion (not shown) to be connected to electrode terminals 11. Bus bar 14 is connected to electrode terminals 11, by inserting electrode terminals 11 into the connection portion, radiating a laser beam to the boundary between electrode terminals 11 and the connection portion, and welding the connection portion to electrode terminals 11. The bus bar may have the following structure:

male screws are disposed at the electrode terminals, the bus bar includes through holes into which the electrode terminals are inserted, nuts are tightened to the male screws of the electrode terminals inserted into the through holes, and thus the bus bar is connected to the electrode terminals; or female screw holes are disposed at the electrode terminals, set screws that penetrate the bus bar are screwed into the female screw holes, and then the bus bar is connected to the electrode terminals.

The battery pack shown in the drawings includes resin-made insulating cover 8 disposed on the upper surface of cell stacked body 2. The edges on the opposite sides of insulating cover 8 are open, and electrode terminals 11 are exposed through the openings. In the battery pack, on the upper surface side of insulating cover 8, bus bar 14 as a metal plate is connected to electrode terminals 11 exposed through the openings in insulating cover 8, and a plurality of rectangular cells 1 are interconnected in a predetermined array.

(End Surface Spacer 13)

Cell stacked body 2 includes end plates 3 on the opposite end surfaces while end surface spacers 13 are sandwiched between cell stacked body 2 and end plates 3. As shown in FIG. 2 and FIG. 3, end surface spacers 13 are disposed between cell stacked body 2 and end plates 3, and insulate end plates 3 from cell stacked body 2. Each end surface spacer 13 is made of an insulating material such as a resin and is formed in a thin plate shape or a sheet shape. End surface spacers 13 shown in the drawings each include plate portion 13X having a size allowing it to cover the whole opposed surface of rectangular cell 1. Plate portions 13X are disposed between end plates 3 and rectangular cells 1 that are disposed at the opposite ends of cell stacked body 2.

In each end surface spacer 13 of FIG. 2 and FIG. 3, terminal-surface cover portion 13A for covering terminal surface 10 of rectangular cell 1 is connected to the upper edge of plate portion 13X. End surface spacer 13 of FIG. 2 includes terminal-surface cover portion 13A projecting to the rectangular cell 1 side over the whole upper edge of plate portion 13X. Thus, in such a structure where terminal-surface cover portion 13A is disposed over the whole upper edge of plate portion 13X, terminal surface 10 as the upper surface of rectangular cell 1 is certainly covered while the insulating distance between end plate 3 and cell stacked body 2 is secured. Thus, the insulating property can be improved.

(End Plate 3)

End plates 3 are disposed at the opposite ends of cell stacked body 2 in the stacking direction of rectangular cells 1, and end plates 3 are disposed outside end surface spacers 13 and grasp cell stacked body 2 from the opposite ends. End plates 3 include first end plate 3A disposed at one end of cell stacked body 2 and second end plate 3B disposed at the other end. At least one of first end plate 3A and second end plate 3B is formed of first member 5 made of a first metal material and second member 6 made of a second metal material different from the first metal material. In the battery pack shown in the drawings, first end plate 3A and second end plate 3B each have a two-component structure formed of first member 5 and second member 6. First member 5 and second member 6 made of different metal materials are stacked in the stacking direction of rectangular cells 1, and a stacked body of first member 5 and second member 6 is disposed at each of the opposite ends of cell stacked body 2.

The rigidity of end plate 3 formed of first member 5 and second member 6 is increased and the weight of the whole end plate 3 is reduced, by appropriately selecting one of the combinations of the types of the first metal material constituting first member 5 and the second metal material constituting second member 6. In end plate 3, the rigidity of the second metal material constituting second member 6 is made higher than that of the first metal material constituting first member 5. In other words, by making the second metal material harder than the first metal material, the rigidity of the whole end plate formed as a stacked body of first member 5 and second member 6 is made higher than that of an end plate produced as a single body made of the first metal material. In end plate 3, the specific gravity of the first metal material constituting first member 5 is made lower than that of the second metal material constituting second member 6. In other words, by making the first metal material more lightweight than the second metal material, the weight of the whole end plate formed as a stacked body of first member 5 and second member 6 is made smaller than that of an end plate produced as a single body made of the second metal material. Regarding a conventional metal-made end plate that is made of a single member and has a high rigidity and a high specific gravity, the extension in the cell stacking direction can be suppressed by the high rigidity, but the weight is increased. Conversely, regarding a metal-made end plate having a low rigidity and a low specific gravity, the weight can be reduced, but the rigidity decreases and the extension cannot be suppressed. While, in the present invention, end plate 3 is formed by stacking first member 5 made of the first metal material of a low specific gravity and second member 6 made of the second metal material of a high rigidity. Therefore, the rigidity is increased while weight increase is suppressed, and the extension in the cell stacking direction is suppressed.

Regarding the metal material of end plate 3 that achieves the above-mentioned characteristic, as the first metal material constituting first member 5, a metal material is appropriately selected that has a specific gravity lower than that of the second metal material, and, preferably, can facilitate the molding or processing. Specifically, as the first metal material, aluminum or an aluminum alloy can be employed. As the first metal material, however, a metal other than aluminum or an aluminum alloy—for example, a zinc alloy or magnesium alloy—can be employed. As the second metal material constituting second member 6, a metal material of a rigidity higher than that of the first metal material—for example, iron or an iron alloy—can be employed. Preferably, when the second metal material is formed of a steel plate such as a high-tensile steel plate, a higher rigidity can be achieved.

In end plate 3 as a stacked body of first member 5 and second member 6, the thickness of first member 5 in the stacking direction of rectangular cells 1 is made greater than that of second member 6. In this structure, first member 5 made of the first metal material of a low specific gravity is thickened, and second member 6 made of the heavy second metal material of a high rigidity is thinned, so that a high rigidity can be achieved while the weight of whole end plate 3 is suppressed. In first member 5 molded of the first metal material of a low specific gravity, the degree of freedom during the molding and processing can be further enhanced by increasing the thickness. Therefore, although the details will be described later, the processing for fixing connection member 4 can be easily performed, or the processing for fixing first member 5 to a base plate as a fixing portion of a vehicle or base—for example, forming a recess or punching a through hole—can be easily performed.

In end plate 3 shown in the drawings, first member 5 is a metal block and second member 6 is a metal plate. The whole of first member 5 as a metal block is made of aluminum or an aluminum alloy. First member 5 made of aluminum or an aluminum alloy is produced in a predetermined shape by die casting or extrusion molding. Especially, when first member 5 is produced by aluminum die casting, a high workability and a high corrosion resistance can be achieved while the whole is made lightweight. Second member 6 as a metal plate is produced by cutting a high-tensile steel plate of a predetermined thickness into a predetermined shape. Second member 6 as a metal plate includes planar plate portion 60, and end plate 3 is formed by stacking plate portion 60 on the opposed surface of first member 5 as a metal block.

In end plate 3 as a stacked body of first member 5 and second member 6, second member 6 is disposed between first member 5 and cell stacked body 2. Thus, second member 6 that has a high rigidity and is hard to be deformed by an external force is disposed so as to face cell stacked body 2, and hence a cell expansion reaction force generated on the opposite end surfaces of cell stacked body 2 is received on the second member 6 side of a high rigidity. Thus, the deformation of end plate 3 can be effectively prevented. The battery pack has a structure where first member 5 formed of a metal block is disposed outside the battery pack. Therefore, the degree of freedom in shape during the molding is high, and first members 5 having undergone a desired molding and processing can be disposed on the opposite ends of the battery pack, and can be ideally fixed to connection member 4 or an installation place.

Furthermore, in end plate 3 shown in drawings, in order to decrease the thickness of whole end plate 3 in the state where first member 5 and second member 6 are stacked, first member 5 is connected to second member 6 in an engagement structure. In first member 5 shown in FIG. 3 and FIG. 5, engagement recess 50 with which second member 6 is engaged is formed by denting, into a recess shape, a surface bonded to second member 6. In first member 5 shown in the drawings, a substantially whole—except the upper end—of the surface facing second member 6 is molded in a one-step lower shape, thereby forming engagement recess 50. Engagement recess 50 has a depth equivalent to the thickness of plate portion 60 of second member 6 as a metal plate. The thickness of plate portion 60 is absorbed by engagement recess 50 in the state where second member 6 is engaged with engagement recess 50, thereby preventing end plate 3 as a stacked body of first member 5 and second member 6 from becoming thick. In first member 5, the depth of engagement recess 50 can be set substantially equal to or slightly smaller than the thickness of plate portion 60. In end plate 3 shown in FIG. 3, the depth of engagement recess 50 is set slightly smaller than the thickness of plate portion 60. In the state where end plate 3 is stacked on an end surface of cell stacked body 2, the surface of second member 6 that faces cell stacked body 2 is in surface contact with the end surface of cell stacked body 2, actually, with end surface spacer 13. In this structure, a cell expansion reaction force generated on the opposite end surfaces of cell stacked body 2 is received by second member 6 of a high rigidity, so that this structure can prevent the cell expansion reaction force from directly acting on first member 5. Therefore, by reducing the load on first member 5, the deformation of end plate 3 can be effectively suppressed. In the end plate, however, the plate portion of the second member does not necessarily need to project from the first member toward the cell stacked body, and the second member and first member can be disposed on the same plane on the surface facing the cell stacked body. In other words, the cell-side surface of a part of the first member that does not include the engagement recess and the cell-side surface of the second member can be disposed on the same plane.

End plate 3 formed of first member 5 and second member 6 has a rectangular shape having a shape and dimension substantially the same as those of the outer shape of rectangular cell 1, and is disposed so as to face an end surface of cell stacked body 2. In end plate 3 shown in the drawings, the lateral width of first member 5 is set equal to the width of rectangular cell 1, and the vertical height of first member 5 is set slightly lower than the height of rectangular cell 1. Regarding second member 6 stacked on the surface of first member 5 that faces cell stacked body 2, the lateral width is set equal to the width of first member 5, and the vertical length is set lower than the height of first member 5. Thus, second member 6 has a size corresponding to a part of the first member other than its upper end. In the present description, the vertical direction means the vertical direction in the drawing, the lateral direction means the lateral direction in the drawing and means the horizontal direction orthogonal to the cell stacking direction.

As shown in FIG. 3, end plate 3 presses not the whole surface of rectangular cell 1 facing it, but presses a part of rectangular cell 1 other than the upper end. Especially, second member 6 stacked inside first member 5 presses a part of rectangular cell 1 other than the upper end. However, second member 6 can press a large lower-region including a center part of rectangular cell 1, so that the cell expansion reaction force generated on the opposite end surfaces of cell stacked body 2 can be received on second member 6. That is because mainly the center part of rectangular cell 1 expands during the charge or discharge. Therefore, the size of second member 6 stacked on first member 5 is set so that second member 6 can press a region including the center part of rectangular cell 1, preferably a region of 50% or more, more preferably a region of 60% or more, of the opposed surface of rectangular cell 1. Above-mentioned end plate 3 does not press the upper end of rectangular cell 1 in the stacking direction, so that the terminal surface 10 side on which electrode terminals 11 and the sealing plate including a gas exhaust valve or the like are disposed is prevented from being pressed strongly. Thus, these components can be effectively prevented from being deformed or damaged.

Reinforcing rib 61 is formed by folding an outer rim of second member 6 as a metal plate. Second member 6 having this structure is reinforced by reinforcing rib 61 disposed at its outer rim, and obtains a higher rigidity against bending. In second member 6 shown in the drawings, the upper edge and lower edge of a central part of plate portion 60 are folded toward first member 5, thereby forming reinforcing ribs 61 extending horizontally. The bending rigidity of second member 6 in the horizontal direction can be increased by disposing reinforcing ribs 61 on both the upper edge and the lower edge. However, a reinforcing rib may be disposed on only one of the upper edge and the lower edge of the second member. Furthermore, a vertically extending reinforcing rib (not shown) may be formed by folding a side edge of the second member toward the first member. The bending rigidity of the second member in the vertical direction can be increased by the vertically extending reinforcing rib. In second member 6 shown in FIG. 4 to FIG. 6, reinforcing ribs 61 on the upper edge and lower edge have a linearly extending shape. Each reinforcing rib 61 having this structure can be easily formed by pressing second member 6 as a metal plate. The shape of the reinforcing rib may be a shape inclined with respect to the horizontal direction, a bent shape, or a partially and vertically projecting shape. Thus, a second member including a reinforcing rib having a complicated shape can obtain a high rigidity against bending in any direction other than the horizontal direction.

First member 5 as a metal block includes recesses 51 for guiding reinforcing ribs 61 disposed on second member 6. Each recess 51 has a shape in which each recess 51 can guide reinforcing rib 61 facing it, and is formed as a groove or a stepped recess. Reinforcing rib 61 is disposed in recess 51. First member 5 of FIG. 5 includes recess 51A for guiding reinforcing rib 61A disposed on the upper edge of second member 6, and recess 51A is positioned at the upper end of the surface facing second member 6 and at the upper end of engagement recess 50. Recess 51A is formed in a groove shape extending horizontally. Furthermore, first member 5 of FIG. 6 includes, on its bottom surface, recess 51B for guiding reinforcing rib 61B disposed on the lower edge of second member 6. Recess 51B on the bottom surface of first member 5 is formed as a stepped recess having a step shape where a central part of the bottom surface is one-step lower than the opposite side parts. Recess 51B is disposed in a central part of the bottom surface of first member 5, so that reinforcing rib 61B is engaged with the gap between the projections formed on the opposite side parts. Second member 6 is connected to first member 5 at a fixed position by the following processes:

plate portion 60 of second member 6 is engaged with engagement recess 50 disposed in the surface facing second member 6;

reinforcing rib 61A disposed on the upper edge of second member 6 is guided to groove-like recess 51A disposed at the upper end of engagement recess 50; and reinforcing rib 61B disposed on the lower edge of second member 6 is guided to recess 51B as the stepped recess disposed in the bottom surface.

Reinforcing rib 61B is disposed on the lower surface of first member 5.

In end plate 3, first member 5 and second member 6 are fixed in an adhesion state. In end plate 3 shown in the drawings, second member 6 is pasted on and fixed to first member 5 via tape 15 having adhesive layers on its opposite surfaces. However, first member 5 and second member 6 may be bonded and fixed to each other via an adhesive. In such a structure where first member 5 and second member 6 are fixed in an adhesion state, the rigidity is the sum of the rigidities of first member 5 and second member 6, so that the rigidity of whole end plate 3 is further increased. Also in the manufacturing process, by fixing first member 5 to second member 6, end plate 3 can be handled in an integrally connection state and the manufacturing can be facilitated.

First member 5 and second member 6 that are fixed in a stacked state in the above process are stacked and fixed to fixed positions in a mutually positioned state. In order to position first member 5 and second member 6 of end plate 3, through holes 52 and 62 for positioning are opened at the positions at which first member 5 faces second member 6. In first member 5 of FIG. 5, a plurality of through holes 52 that are vertically separate from each other are formed in each of the opposite side parts of engagement recess 50. Although the details will be described later, through holes 52 serve as connection holes for fixing connection members 4. First member 5 shown in the drawings includes a total of six through holes 52, namely three through holes 52 vertically disposed in each of the opposite side parts. Second member 6 also includes through holes 62 that are opened at the positions facing the plurality of through holes 52 disposed in first member 5. First member 5 and second member 6 that include through holes 52 and 62 at the positions facing each other are positioned in the state where positioning pins (not shown) are inserted into through holes 52 and 62, and are stacked and connected to the fixed positions via tape 15 having adhesive layers on its opposite surfaces.

(Another Example of End Plate)

End plate 3 formed of first member 5 and second member 6 may have structures shown in FIG. 7 to FIG. 12. Second member 6 of end plate 3 shown in each of these drawings includes, on the surface facing first member 5, fitting projection 66 projecting toward first member 5. In second member 6 shown in each drawing, fitting projection 66 is formed as ridge 66A, 66B, or 66C, and ridge 66A, 66B, or 66C further increases the rigidity of second member 6 formed of a metal plate. The surface of first member 5 that faces second member 6 includes fitting recess 56 for guiding fitting projection 66 of second member 6. Fitting projection 66 of second member 6 is guided to fitting recess 56, and is disposed in fitting recess 56. Thus, first member 5 and second member 6 can be stacked at the fixed positions.

Figure 7:
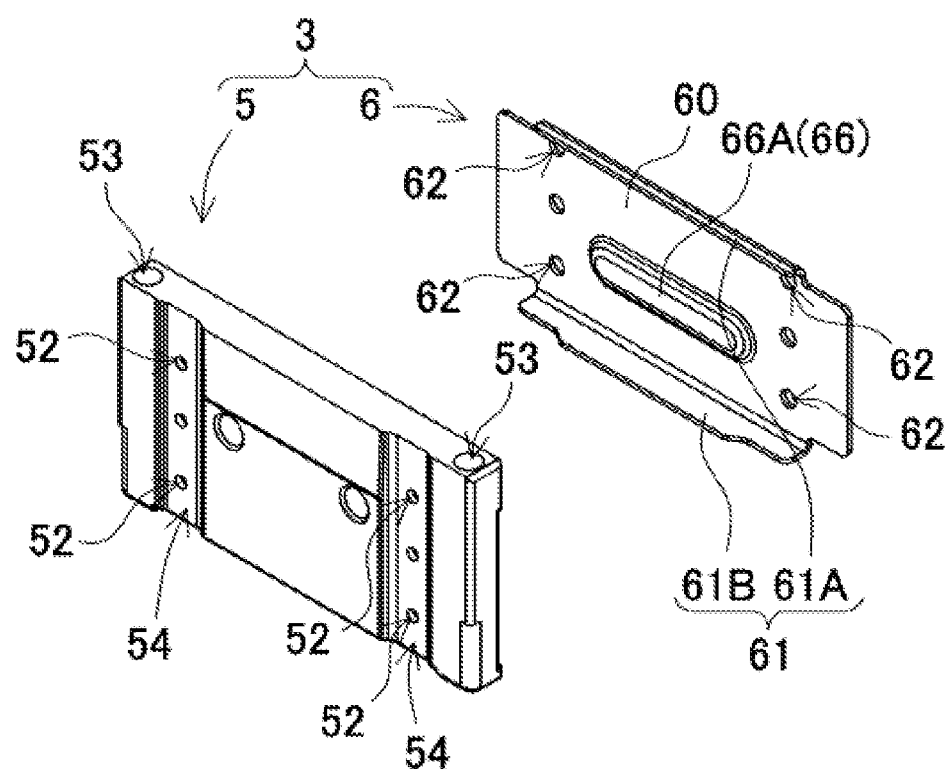
FIG. 7 is an exploded perspective view showing another example of the end plate.
Figure 8:
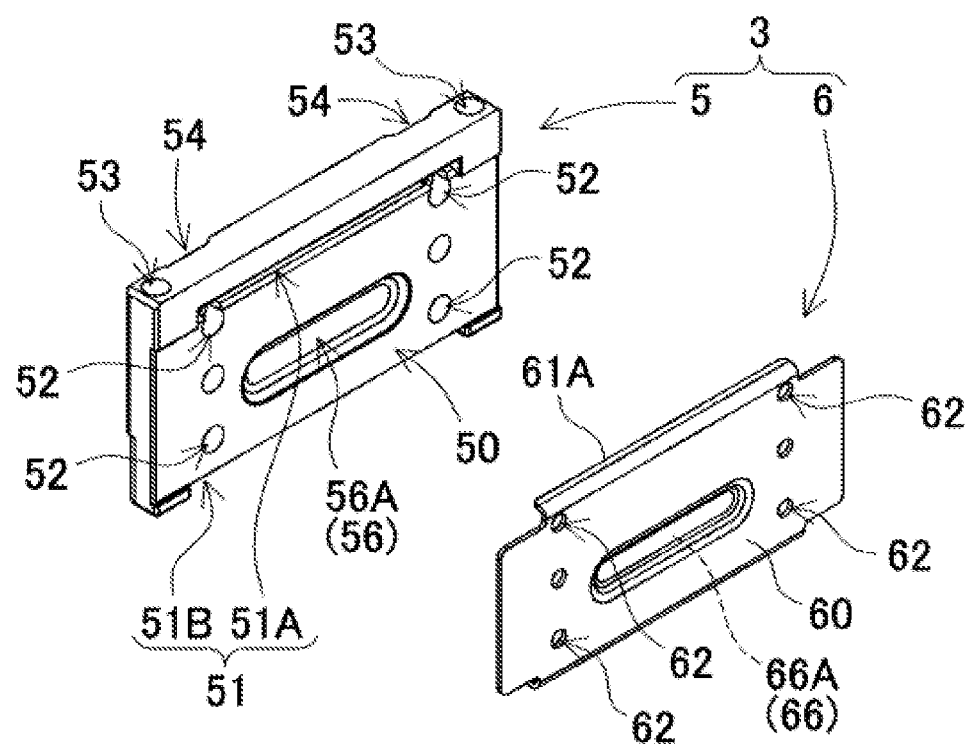
FIG. 8 is an exploded perspective view when the end plate shown in FIG. 7 is viewed from its back side.

In second member 6 shown in FIG. 7 and FIG. 8, horizontally extending ridge 66A is disposed on the surface facing first member 5 and in a central part of plate portion 60. Ridge 66A is formed by pressing second member 6 as a metal plate from the back surface side. A recess corresponding to ridge 66A is formed on the opposite surface of ridge 66A to first member 5. In second member 6 having this structure, the rigidity can be further increased by ridge 66A formed in a central part. Especially, the bending rigidity in the horizontal direction can be further increased by reinforcing ribs 61 disposed on the upper and lower edges and ridge 66A in the central part. In first member 5 shown in FIG. 7 and FIG. 8, horizontally extending fitting recess 56A is disposed on the surface facing second member 6 and at a position facing ridge 66A. In end plate 3, second member 6 is stacked at the fixed position of first member 5 and connected to first member 5 in the state where ridge 66A of second member 6 is guided to fitting recess 56A of first member 5. Therefore, first member 5 and second member 6 can be interconnected without increasing the thickness of the whole of end plate 3.

Figure 9:
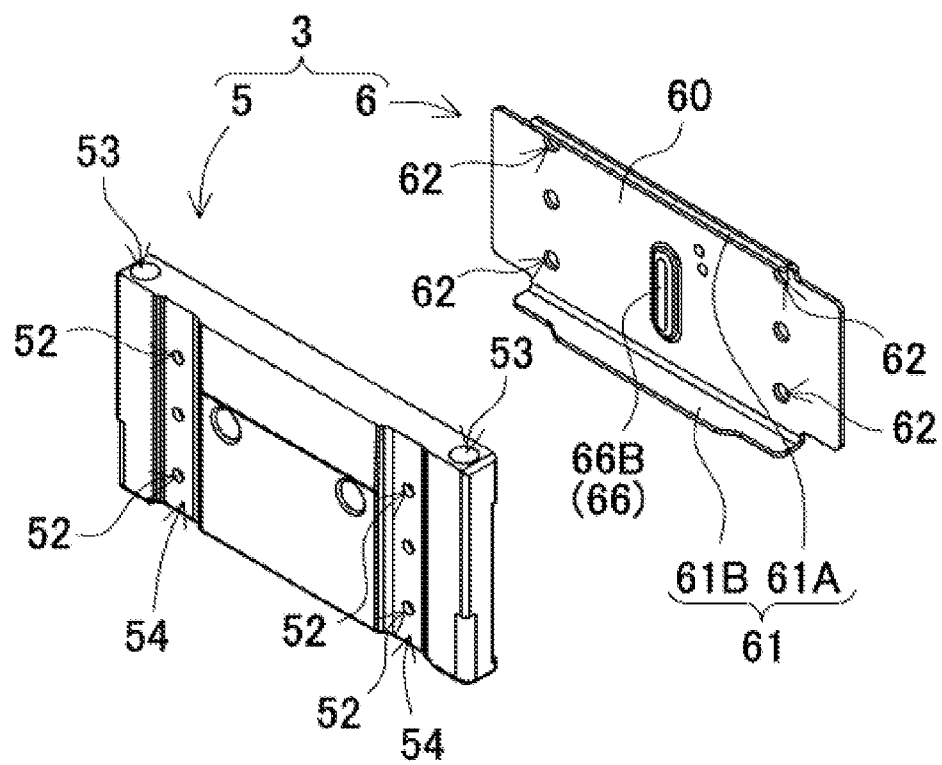
FIG. 9 is an exploded perspective view showing yet another example of the end plate.
Figure 10:
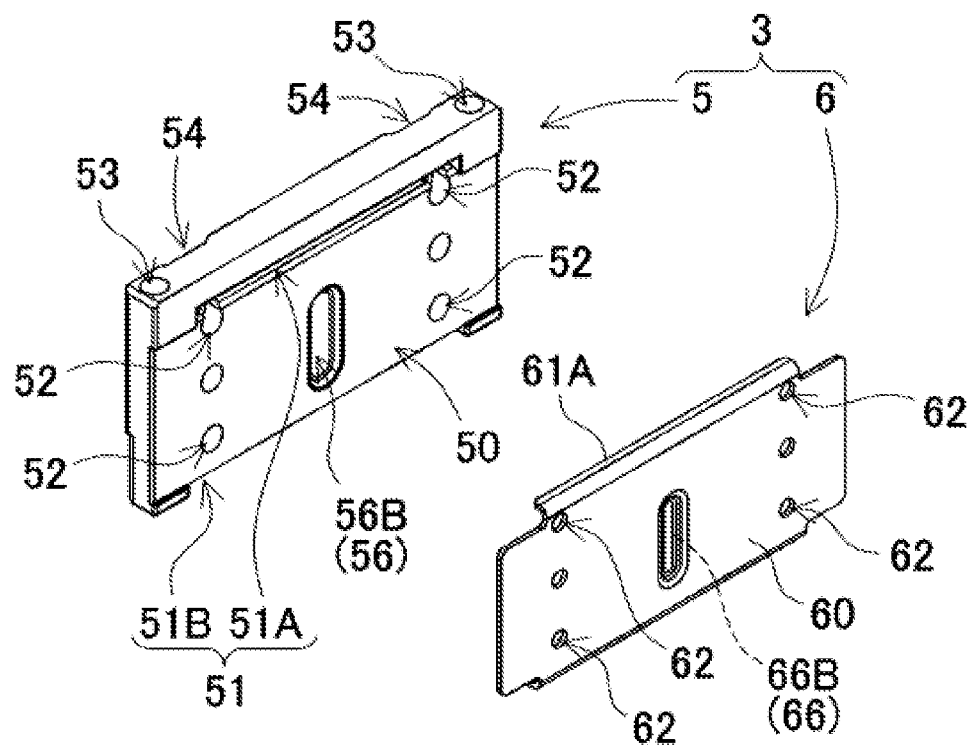
FIG. 10 is an exploded perspective view when the end plate shown in FIG. 9 is viewed from its back side.

In second member 6 shown in FIG. 9 and FIG. 10, vertically extending ridge 66B is disposed on the surface facing first member 5 and in a central part of plate portion 60. Ridge 66B is formed by pressing second member 6 as a metal plate from the back surface side. A recess corresponding to ridge 66B is formed on the opposite surface of ridge 66B to first member 5. Also in second member 6 having this structure, the rigidity can be further increased by ridge 66B formed in a central part. Especially, the bending rigidity in the horizontal direction can be increased by reinforcing ribs 61 disposed on the upper and lower edges, and the bending rigidity in the vertical direction can be further increased by ridge 66B disposed in the central part. In first member 5 shown in FIG. 9 and FIG. 10, vertically extending fitting recess 56B is disposed on the surface facing second member 6 and at a position facing ridge 66B. Also in end plate 3, second member 6 is stacked at the fixed position of first member 5 and is connected to first member 5 in the state where ridge 66B of second member 6 is guided to the fitting recess 56B of first member 5. Therefore, first member 5 and second member 6 can be interconnected without increasing the thickness of the whole of end plate 3.

Figure 11:
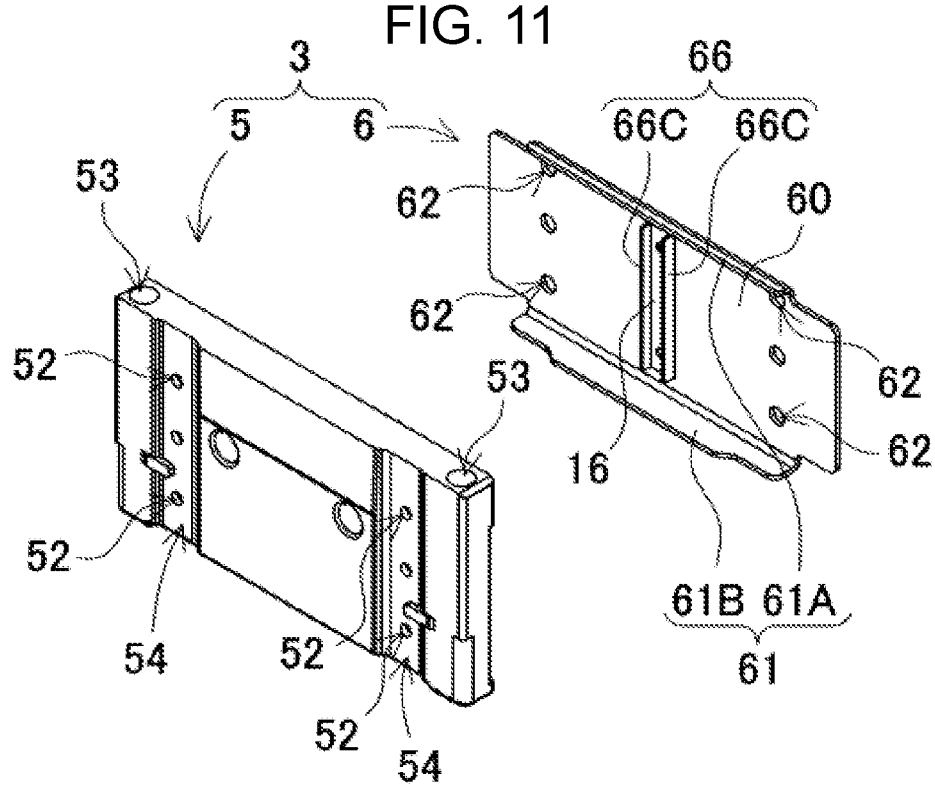
FIG. 11 is an exploded perspective view showing still another example of the end plate.
Figure 12:
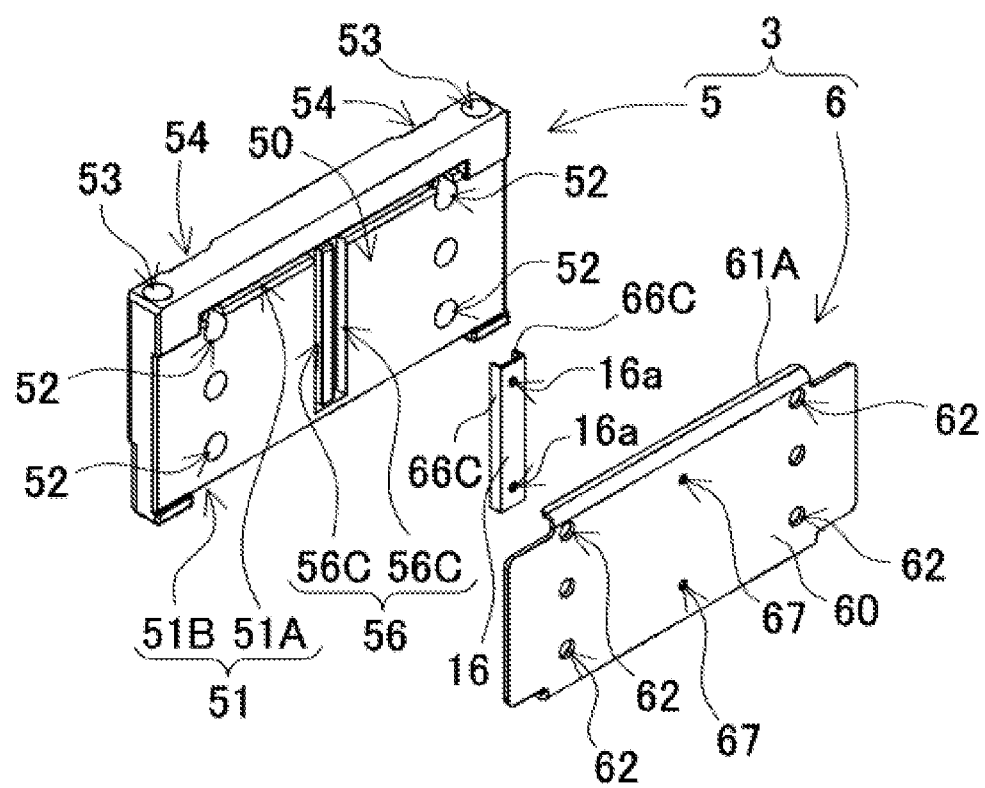
FIG. 12 is an exploded perspective view when the end plate shown in FIG. 11 is viewed from its back side.

In second member 6 shown in FIG. 11 and FIG. 12, fitting projection 66 is formed on the surface facing first member 5 by fixing metal member 16 as a separate member to the surface. In second member 6 shown in these drawings, two ridges 66C are formed, by fixing a metal steel having a channel-shaped cross section to a central part of plate portion 60 in a state where the metal steel extends vertically. Metal member 16 is fixed to plate portion 60 by welding or the like. In second member 6 shown in the drawings, through holes 67 for positioning are opened in the central part in order to fix metal member 16 to a fixed position. Metal member 16 also includes through holes 16a at the positions facing through holes 67 of second member 6. Metal member 16 and second member 6 are positioned and fixed to the fixed positions in the state where positioning pins (not shown) are inserted into through holes 16a and 67 facing each other. In second member 6 having this structure, the rigidity can be increased while the plurality of ridges 66C are easily formed by fixing metal member 16 as a separate member. In second member 6 shown in the drawings, metal member 16 including ridges 66C is fixed in the vertically extending state, so that the bending rigidity in the vertical direction can be further increased. However, the metal member including the ridges can be disposed horizontally or can be disposed obliquely. Furthermore, in first member 5 shown in FIG. 11 and FIG. 12, two fitting recesses 56C that extend vertically in groove shapes are formed in the surface facing second member 6 and at the positions facing ridges 66C. Also in end plate 3, second member 6 is stacked at the fixed position of first member 5 and connected to first member 5 in the state where ridges 66C of second member 6 are guided to fitting recesses 56C of first member 5. Therefore, first member 5 and second member 6 can be interconnected without increasing the thickness of the whole of end plate 3.

Figure 4:
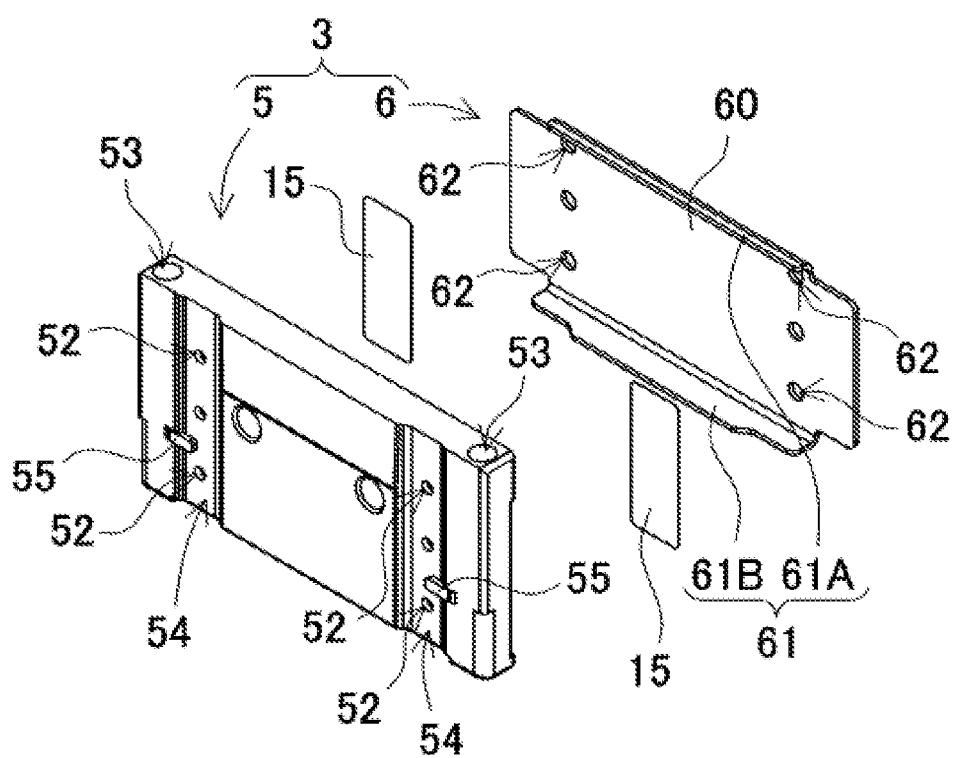
FIG. 4 is an exploded perspective view of an end plate of the battery pack shown in FIG. 2.
Figure 5:
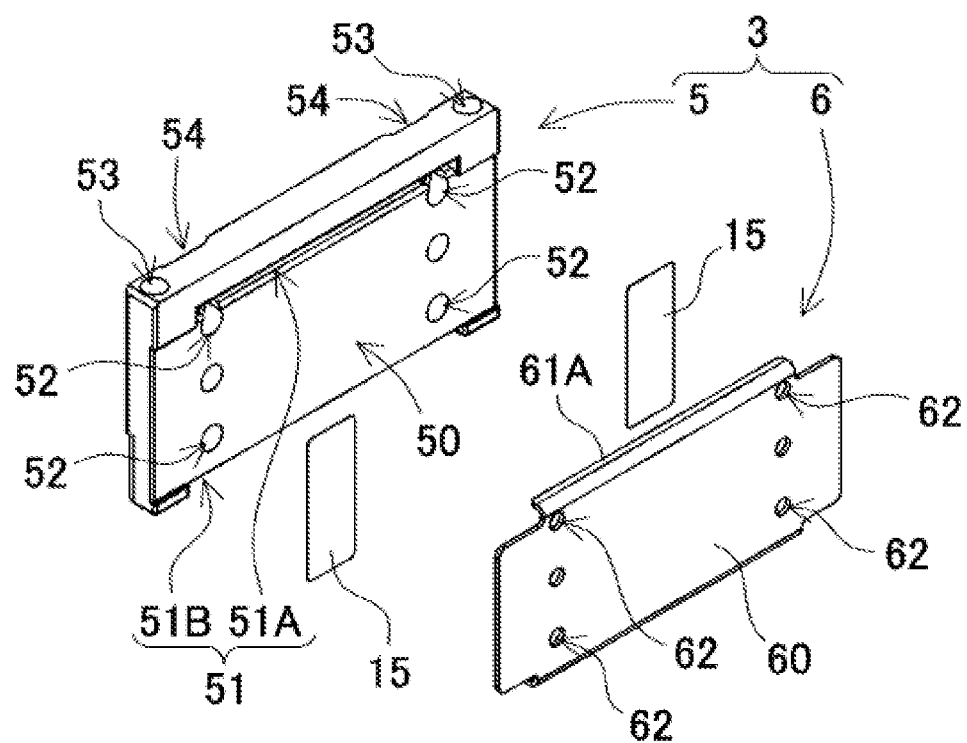
FIG. 5 is an exploded perspective view when the end plate shown in FIG. 4 is viewed from its back side.

Furthermore, in end plate 3, first member 5 includes insertion holes 53 into which connection tools (not shown) for fixing the battery pack to a base plate of a vehicle or base or fixing the battery pack to a cooling plate to be disposed on the lower surface thereof are inserted. First member 5 shown in FIG. 4 to FIG. 6 includes vertically penetrating insertion holes 53, and the battery pack can be fixed by inserting bolts as connection tools into insertion holes 53. The inner diameter of insertion holes 53 is set substantially equal to or slightly greater than the outer diameter of the bolts to be inserted into them. First member 5 shown in FIG. 4 to FIG. 6 includes insertion holes 53 that vertically penetrate the opposite side portions. In first member 5, as shown in FIG. 5, insertion holes 53 are positioned and opened outside through holes 52 penetrating and opened in the stacking direction, and hence do not cross through holes 52. In other words, first member 5 includes through holes 52 that are closer to the center side than insertion holes 53 are.

In the above-mentioned battery pack, a cooling plate (not shown) is disposed on the bottom surface of the cell stacked body in a thermally coupled state, and the rectangular cells can be cooled by forcibly cooling the cooling plate. Although not shown, the battery pack may have a structure in which a cooling gap through which cooling air is forcibly blown is disposed in each insulating spacer. This battery pack, for example, may have the following structure: grooves are formed in the surfaces of the insulating spacers that face the rectangular cells; cooling gaps are formed between the insulating spacers and the rectangular cells; and cooling air is blown into the cooling gaps to cool the rectangular cells.

Figure 13:
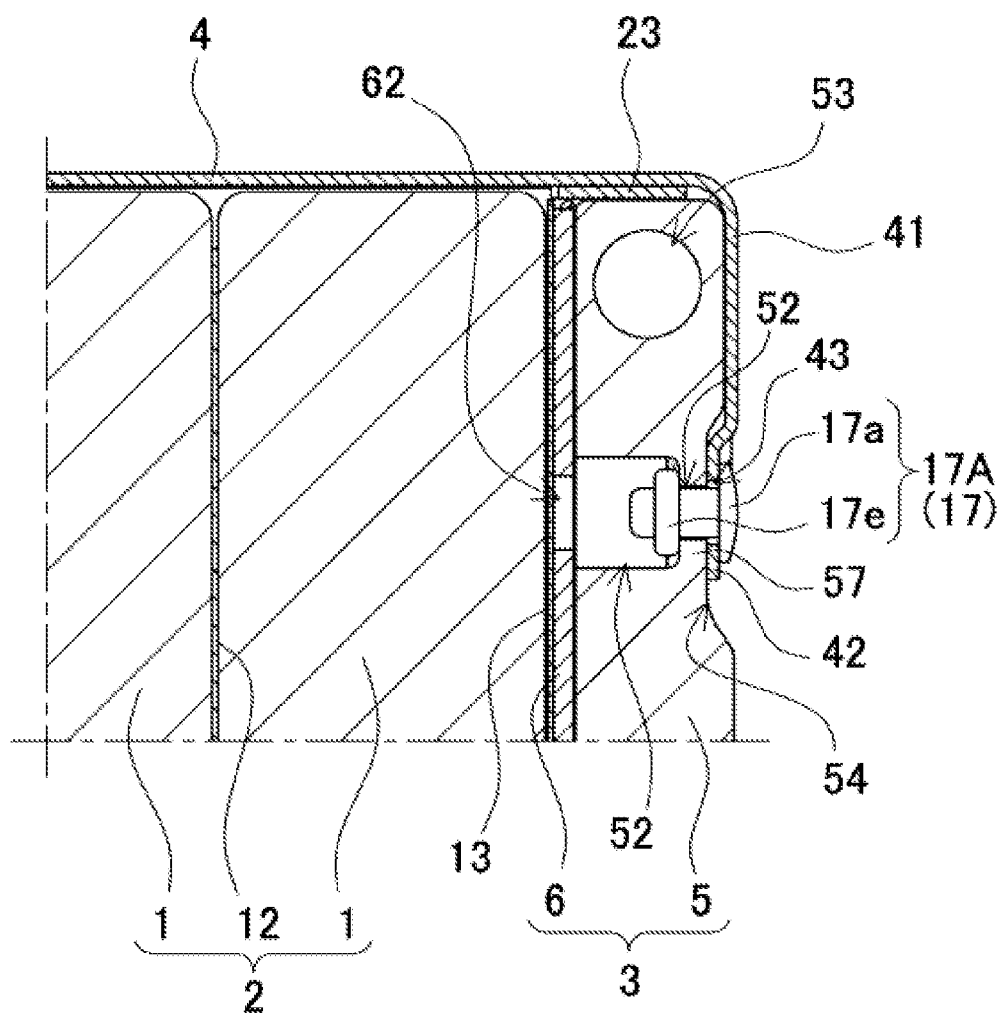
FIG. 13 is an exploded perspective view of a connection member.

As shown in FIG. 1 and FIG. 2, above-mentioned end plates 3 are disposed at the opposite ends of cell stacked body 2, and are fastened via connection members 4 disposed along the opposite side surfaces of cell stacked body 2. In end plates 3 shown in FIG. 4 to FIG. 12, connection recesses 54 with which portions 41 disposed at the opposite ends of each connection member 4 are engaged are disposed on the outer surfaces of first members 5 so that connection member 4 can be fixed to a fixed position. As shown in FIG. 13, each connection recess 54 in first member 5 has a shape in which connection recess 54 can be engaged with engagement connection portion 42 disposed at the tip of fixing portion 41 of connection member 4. In first member 5 shown in each of FIG. 4 to FIG. 12, vertically-extending groove-shaped connection recesses 54 are disposed in the opposite side portions of the outer surface. The tip of each of fixing portions 41 disposed at the opposite ends of connection member 4 is folded into a shape engaging with connection recess 54, thereby forming engagement connection portion 42. Connection member 4 is fitted into connection recess 54 disposed in first member 5 and is connected to a fixed position in the state where engagement connection portion 42 disposed at the tip of fixing portion 41 is slid vertically.

In first member 5 shown in the drawings, a plurality of through holes 52 are opened in each connection recess 54, and through holes 52 are used as connection holes into which fixing components 17 for fixing engagement connection portion 42 as fixing portion 41 of connection member 4 are inserted. In first member 5 shown in the drawings, each connection recess 54 extending vertically includes through holes 52 that are vertically separate from each other. In first member 5 shown in the drawings, three through holes 52 are disposed in each of connection recesses 54 disposed on the opposite sides, namely a total of six through holes 52 are opened. In first member 5, fixing components 17 are fixed so that they do not drop out of through holes 52 and fix fixing portion 41 to a fixed position in the following processes:

fixing components 17 penetrating engagement connection portion 42 of fixing portion 41 disposed on the outer surface is inserted into through holes 52; and fixing components 17 inserted into through holes 52 is caulked inside first member 5.

Fixing components 17 are rivets 17A. Each rivet 17A includes head portion 17a disposed outside engagement connection portion 42, and caulked portion 17e formed in through hole 52 of first member 5. Engagement connection portion 42 of fixing portion 41 is fixed to first member 5, by using head portion 17a and caulked portion 17e to grasp engagement connection portion 42 and grasped portion 57 as an opening edge of through hole 52 of the first member.

As shown in FIG. 13, through hole 52 in first member 5 has the following structure:

the opening surface area of the outer surface is small, and the inner diameter is set so that fixing component 17 can be inserted into through hole 52 but head portion 17a cannot pass through it; and the opening surface area of the opposed surface side as the opposite side is large, and caulked portion 17e formed by deforming fixing component 17 can be disposed in through hole 52.

As shown in FIG. 13, through hole 52 includes a step portion in it, and the opening edge on the outer surface side having the small inner diameter is grasped as grasped portion 57 by caulked portion 17e and head portion 17a of rivet 17A.

Connection recess 54 of FIG. 13 has a depth at which head portion 17a of rivet 17A does not greatly project from the outer surface of the battery pack in the state where engagement connection portion 42 guided to connection recess 54 is fixed via rivet 17A. In this structure, rivet 17A is disposed without increasing the outer shape of the battery pack, and connection member 4 can be fixed to end plate 3.

(Connection Member 4)

Figure 14:
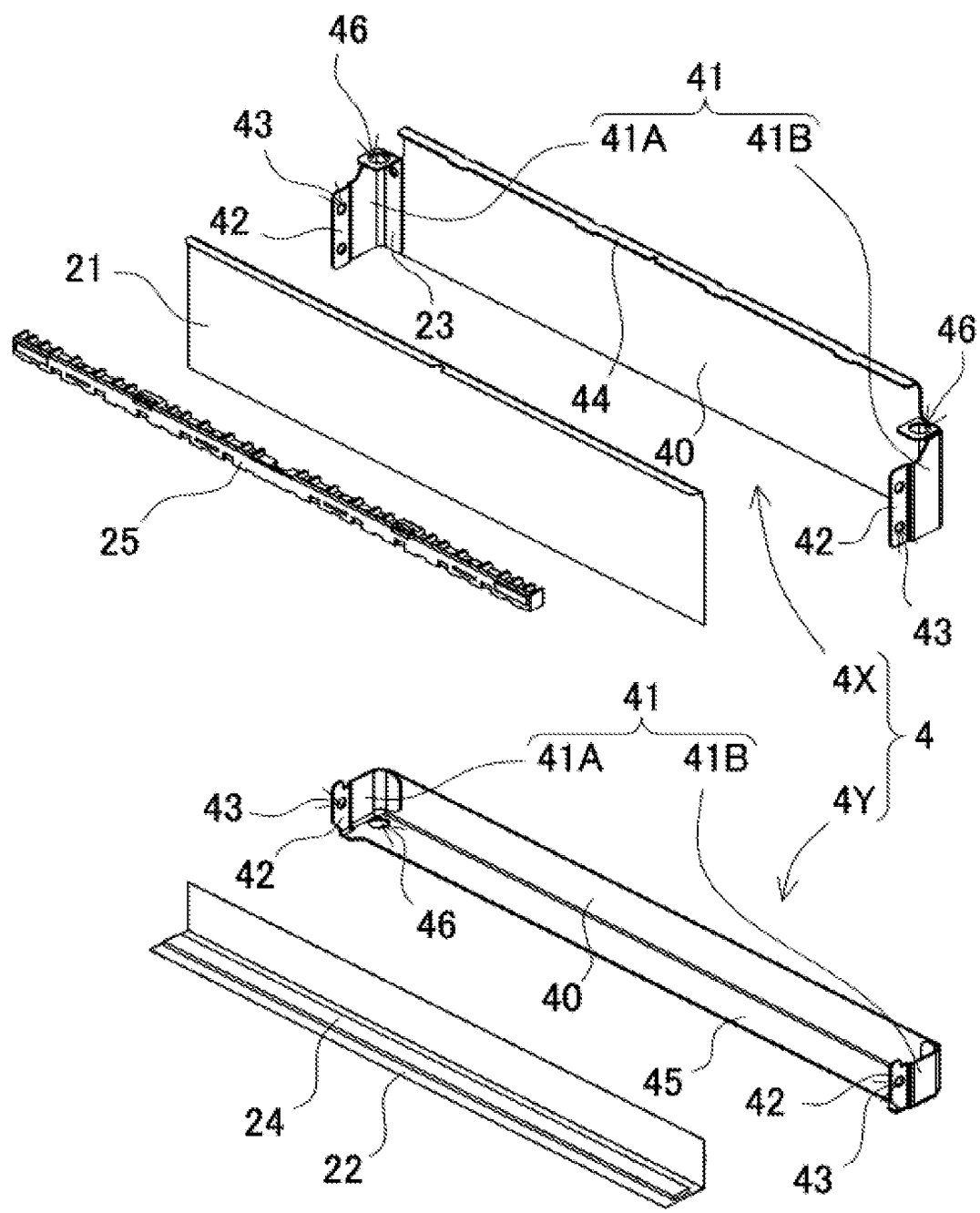
FIG. 14 is a horizontal sectional view of an essential part of a battery system shown in FIG. 1.

As shown in FIG. 1, FIG. 2, and FIG. 14, connection members 4 are extended in the stacking direction of cell stacked body 2, the opposite ends of connection members 4 are fixed to end plates 3 disposed on the opposite end surfaces of cell stacked body 2. Connection members 4 fasten cell stacked body 2 in the stacking direction via end plates 3. Connection members 4 are each formed of a metal plate having a predetermined width and a predetermined thickness along a side surface of cell stacked body 2, and are disposed on the opposite surfaces of cell stacked body 2 so as to face each other. As each connection member 4, a metal plate such as iron can be used, preferably a steel plate can be used. Connection member 4 formed of the metal plate is formed in a predetermined shape by press molding.

In order to fix the opposite ends of each connection member 4 to a pair of end plates 3, fixing portions 41 are formed by folding the opposite ends so as to follow the outer surfaces of end plates 3. Each of connection members 4 shown in FIG. 2 and FIG. 14 includes, at one end, first fixing portion 41A folded so as to follow the outer surface of first end plate 3A, and includes, at the other end, second fixing portion 41B folded so as to follow the outer surface of second end plate 3B. First fixing portion 41A of each connection member 4 is fixed to the outer surface of first end plate 3A, and second fixing portion 41B thereof is fixed to the outer surface of second end plate 3B. Thus, connection members 4 fasten cell stacked body 2 in the stacking direction.

Figure 6:
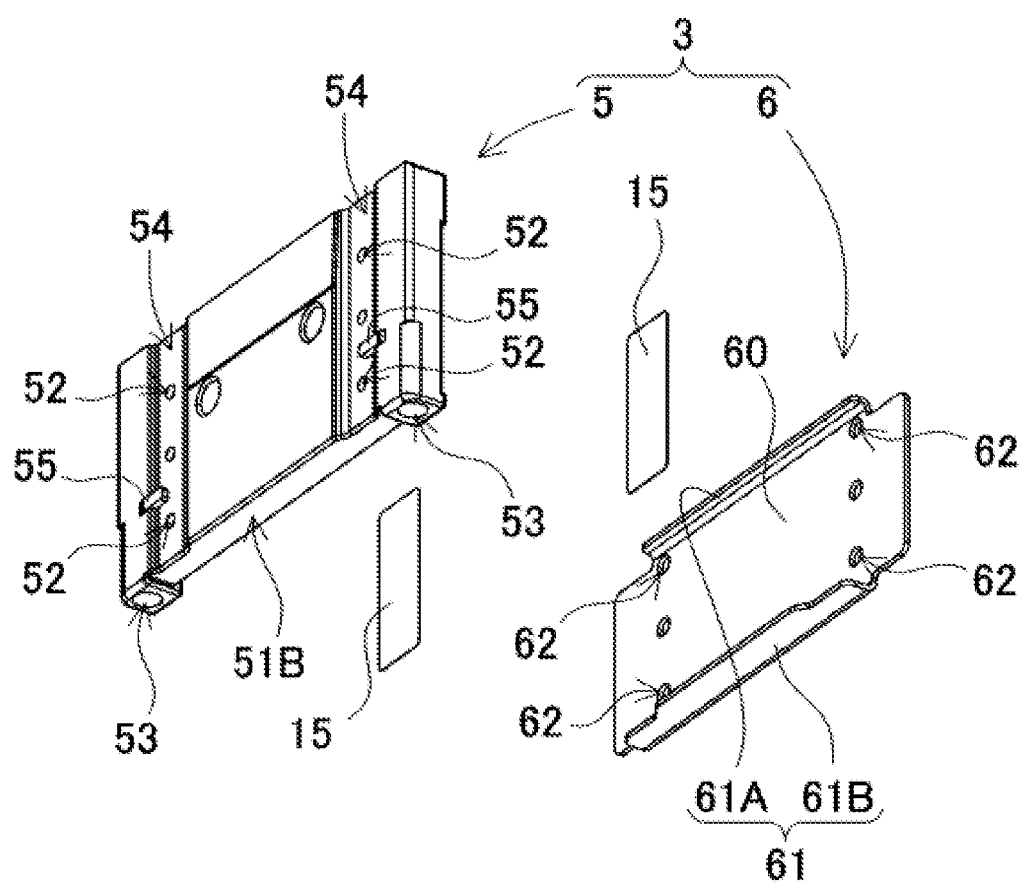
FIG. 6 is an exploded perspective view when the end plate shown in FIG. 4 is viewed from its bottom side.

In each connection member 4, furthermore, the inner shapes of fixing portions 41 disposed at the opposite ends are set substantially the same as the outer shapes at the opposite side portions of first member 5. Thus, connection members 4 can be engaged with first member 5. Connection member 4 in FIG. 13 includes engagement connection portion 42 formed by folding the tip of fixing portion 41 into a shape engaging with connection recess 54 disposed in first member 5. Connection recess 54 of first member 5 is formed in a groove shape extending vertically as shown in FIG. 4 and FIG. 6, so that fixing portion 41 has a shape allowing engagement connection portion 42 as the tip to vertically move along connection recess 54. Connection member 4 has the following structure: connection member 4 is vertically inserted into cell stacked body 2; engagement connection portion 42 of fixing portion 41 is guided to connection recess 54 of first member 5; and the engagement connection portion is engaged with the first member.

Each connection member 4 shown in FIG. 1, FIG. 2, and FIG. 14 is divided into upper and lower portions on the side surface of cell stacked body 2. Connection member 4 includes upper connection member 4X for covering the upper part of the side surface of cell stacked body 2, and lower connection member 4Y for covering the lower part of the side surface of cell stacked body 2. Upper connection member 4X is mounted on cell stacked body 2 from the upside, and is disposed at fixed positions of cell stacked body 2 and end plate 3. Lower connection member 4Y is mounted on cell stacked body 2 from the downside, and is disposed at fixed positions of cell stacked body 2 and end plate 3. Such structure where connection member 4 is vertically mounted on cell stacked body 2 allows connection member 4 to be mounted on it without contact with rectangular cells 1. Therefore, damage of rectangular cells 1 during the mounting of connection member 4 can be certainly prevented.

As shown in FIG. 14, upper connection member 4X includes: body portion 40 disposed along the side surface of cell stacked body 2; fixing portions 41 that are folded at the opposite ends of body portion 40 along end plates 3 and fixed to the outer surfaces of end plates 3; and upper folded portion 44 that is folded along the upper end of a central part of body portion 40 and holds the upper surface of cell stacked body 2. Upper connection member 4X is guided from the upside to connection recess 54 of first member 5 while engagement connection portions 42 disposed at the tips of fixing portions 41 are slid downward, and is disposed at a fixed position of cell stacked body 2. In this state, body portion 40 of connection member 4 is disposed on the side-surface side of cell stacked body 2, and upper folded portion 44 is disposed on the upper surface of cell stacked body 2.

Furthermore, in upper connection member 4X of FIG. 14, upper folded portion 44 is connected to terminal cover 25 for covering the upper surface of each of the opposite edges of insulating cover 8 disposed on the upper surface of cell stacked body 2. Terminal covers 25 are disposed at the opposite edges of insulating cover 8, and cover from the upside and protect bus bars 14 for interconnecting electrode terminals 11 of rectangular cells 1. The opposite edges of insulating cover 8 are protected by terminal covers 25, and a substantially whole surface of insulating cover 8 is covered and protected by top cover 9 disposed on the upper surface.

Furthermore, in upper connection member 4X of FIG. 13, insulating sheet 21 is disposed on the inner surfaces of body portion 40 and upper folded portion 44, and insulating sheet 21 insulates rectangular cells 1 of cell stacked body 2 from upper connection member 4X. Furthermore, in upper connection member 4X of FIG. 13, buffer material 23 is disposed on the inner surfaces of the opposite ends of body portion 40, and protects the side surfaces of end plates 3 from an impact such as vibration. Furthermore, in upper connection member 4X of FIG. 13, folded pieces facing the upper surfaces of first members 5 are formed by inwardly folding the upper ends of the opposite ends of body portion 40. Each folded piece includes insertion hole 46 into which a bolt to be inserted into insertion hole 53 in end plate 3 is inserted.

As shown in FIG. 13, lower connection member 4Y includes: body portion 40 disposed along the side surface of cell stacked body 2; fixing portions 41 that are folded at the opposite ends of body portion 40 along end plates 3 and fixed to the outer surfaces of end plates 3; and lower folded portion 45 that is folded along the lower end of body portion 40 and holds the bottom surface of cell stacked body 2. Lower connection member 4Y is guided from the downside to connection recess 54 of first member 5 while engagement connection portions 42 disposed at the tips of fixing portions 41 are slid upward, and is disposed at a fixed position of cell stacked body 2. In this state, body portion 40 of connection member 4 is disposed on the side-surface side of cell stacked body 2, and lower folded portion 45 is disposed on the bottom surface of cell stacked body 2.

Furthermore, in lower connection member 4Y of FIG. 13, insulating sheet 22 is disposed on the inner surfaces of body portion 40 and lower folded portion 45, and insulating sheet 22 insulates rectangular cells 1 of cell stacked body 2 from lower connection member 4Y. Furthermore, in lower connection member 4Y of FIG. 13, buffer material 24 is disposed on the upper surface of lower folded portion 45, and protects the bottom surface of cell stacked body 2 from an impact such as vibration. Furthermore, lower connection member 4Y of FIG. 13 includes, at the opposite ends of lower folded portion 45, insertion holes 46 into which bolts to be inserted into insertion holes 53 in end plates 3 are inserted.

Each connection member 4 has a surface area that allows connection members 4 to cover a region of 80% or more of the side surfaces of cell stacked body 2 in the state where both side surfaces of cell stacked body 2 are covered with upper connection members 4X and lower connection members 4Y. Although not shown, the connection members may include openings in body portions. Thus, the whole weight can be reduced, and the cost can be reduced.

First members 5 shown in FIG. 1 and FIG. 4 include rib-like projections 55 that extend horizontally in the drawings and are positioned between fixing portions 41 of upper connection members 4X fixed on their outer surfaces and fixing portions 41 of lower connection members 4Y. Thus, the connection positions of upper connection members 4X and lower connection members 4Y to first members 5 are specified.

Engagement connection portions 42 of fixing portions 41 disposed on the outer surfaces of end plates 3 are fixed to first members 5 via fixing components 17. In connection member 4 shown in FIG. 13, through holes 43 into which fixing components 17 are inserted are opened in engagement connection portions 42 of fixing portions 41. Engagement connection portions 42 are fixed to first members 5 in the following processes: fixing components 17 are inserted into through holes 43 in the state where engagement connection portions 42 are engaged with connection recesses 54; and fixing components 17 are fixed in the state where fixing components 17 are inserted into through holes 52 in first members 5.

(Fixing Component 17)

Figure 15:
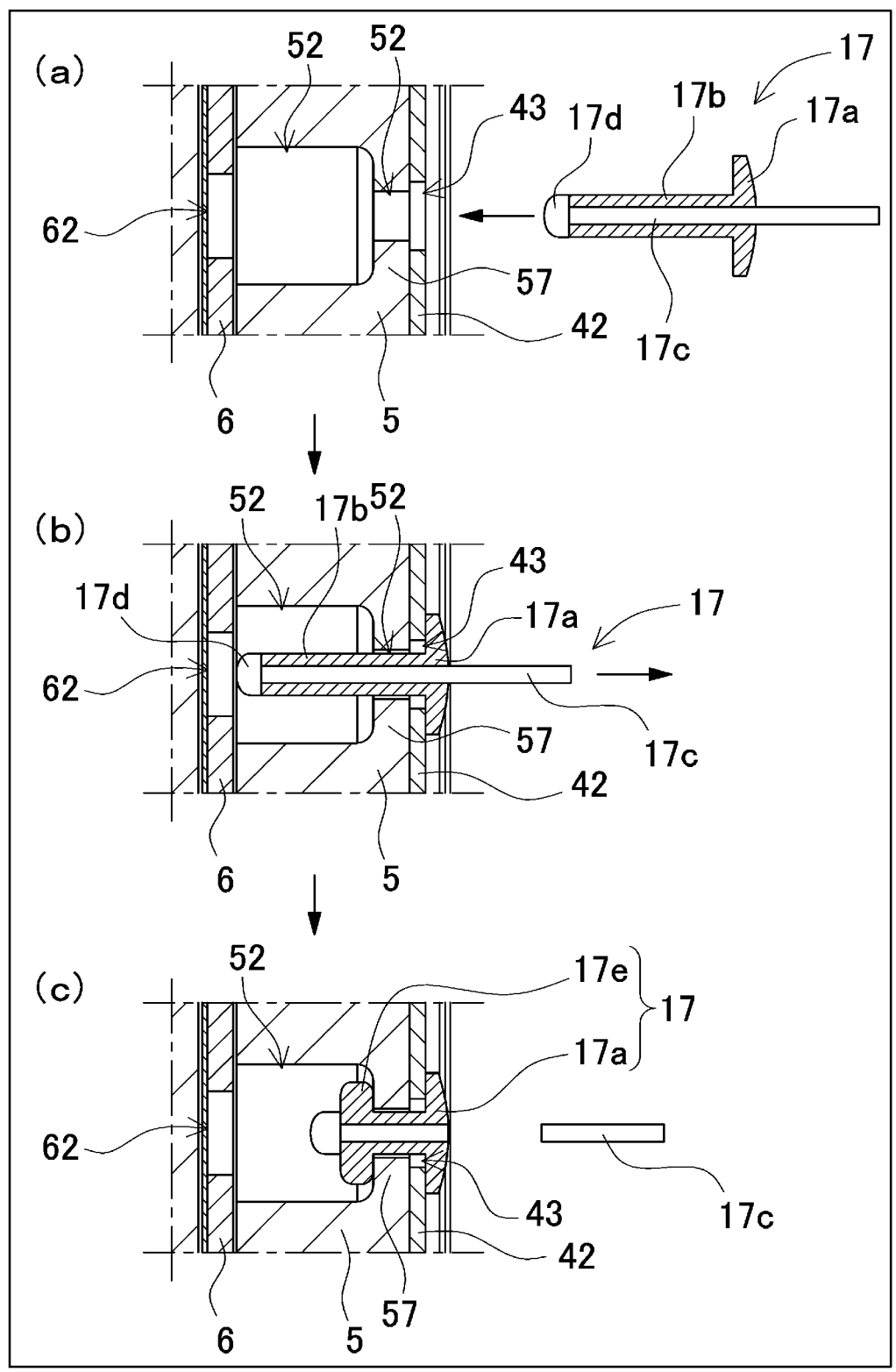
FIG. 15 is a vertical sectional view showing a process of fixing the connection member to the end plate via a fixing component.

Each fixing component 17 is rivet 17A. As shown in FIG. 15, fixing component 17 is inserted, from one side, into through holes 52 and 43 in first member 5 and engagement connection portion 42 that are stacked, one end of fixing component 17 is caulked inside through hole 52 in first member 5 and fixes first member 5 to engagement connection portion 42. Fixing component 17 shown in FIG. 15 includes: a body portion in which collar-like head portion 17a is disposed at one end of cylinder portion 17b; and center pin 17c axially inserted into the body portion. Center pin 17c is inserted into cylinder portion 17b. Stop portion 17d is disposed at the opposite end of center pin 17c to head portion 17a, and has an outer diameter that prevents stop portion 17d from passing through cylinder portion 17b. The outer diameter of cylinder portion 17b is substantially equal to that of stop portion 17d, and these parts are inserted as an insertion portion into through hole 43 in engagement connection portion 42 and through hole 52 in first member 5. The outer diameter of head portion 17a of fixing component 17 is larger than the inner diameters of through holes 43 and 52, and head portion 17a does not pass through holes 43 and 52.

Fixing component 17 having the above-mentioned structure fixes engagement connection portion 42 to first member 5 in the following processes.

(1) As shown in the section (a) of FIG. 15, engagement connection portion 42 is disposed at a fixed position on the outer surface of first member 5. In this state, through hole 43 in engagement connection portion 42 is disposed at a position facing through hole 52 in first member 5.

(2) As indicated by the arrow in the section (a) of FIG. 15, cylinder portion 17b as an insertion portion of fixing component 17 is inserted into through hole 43 in engagement connection portion 42 and through hole 52 in first member 5. As shown in the section (b) of FIG. 15, fixing component 17 is inserted to a position at which head portion 17a as a tail comes into contact with engagement connection portion 42. At this time, there is a possibility that the tip of fixing component 17 is inserted to a position at which the tip penetrates first member 5. However, through hole 62 in second member 6 is disposed on the side facing through hole 52, so that the tip of fixing component 17 is disposed inside through hole 62 and is prevented from projecting to the cell stacked body 2 side.

(3) As indicated by the arrow in the section (b) of FIG. 15, center pin 17c is pulled outward. Center pin 17c can be pulled with a strong force in the pull-out direction by using a device for sucking air, for example.

(4) When center pin 17c is strongly pulled outward, stop portion 17d moves while pressing and caulking cylinder portion 17b.

(5) As shown in the section (c) of FIG. 15, cylinder portion 17b deformed by the outward movement of stop portion 17d forms caulked portion 17e inside through hole 52. Caulked portion 17e is formed in a collar shape, and presses grasped portion 57 as an opening edge on the outer surface side of through hole 52 of first member 5. Furthermore, center pin 17c pulled outward is cut at an intermediate part and is removed. In this state, engagement connection portion 42 and grasped portion 57 as an opening edge of through hole 52 of first member 5 are grasped and fixed by caulked portion 17e and head portion 17a of rivet 17A.

In the above-mentioned battery pack, each of first end plate 3A and second end plate 3B is formed of first member 5 made of a first metal material and second member 6 made of a second metal material. In a battery pack, only any one of first end plate 3A and second end plate 3B may be formed of first member 5 made of the first metal material and second member 6 made of the second metal material. In this battery pack, one end plate 3 has a two-component structure (not shown) including first member 5 and second member 6, and other end plate 3 is set as end plate 3 made of a single metal material. As such end plate 3, for example, end plate 3 in a metal block shape made of aluminum or an aluminum alloy can be used. Thus, the shape of the outer surface of end plate 3 made of a single member also includes a through hole or recess shape disposed in above-mentioned first member 5. This end plate 3 can be also connected and fixed to connection member 4, similarly to above-mentioned end plate 3.

The battery pack of the present invention is optimally applied to a power source device for supplying power to the motor of a vehicle requiring a high power, and is optimally applied to an electric storage device for storing natural energy and midnight power.

The invention claimed is:

1. A battery pack comprising:
 a cell stacked body including a plurality of stacked rectangular cells;
 a first end plate disposed at a first end of the cell stacked body in a stacking direction of the plurality of rectangular cells;
 a second end plate disposed at a second end of the cell stacked body in the stacking direction of the plurality of rectangular cells; and
 a connection member coupled to the first end plate and the second end plate,
 wherein at least one of the first end plate and the second end plate includes a first member made of a first metal material and a second member made of a second metal material different from the first metal material,
 wherein the first member and the second member are stacked in the stacking direction of the plurality of rectangular cells,
 wherein a rigidity of the second metal material is higher than a rigidity of the first metal material,
 wherein a specific gravity of the first metal material is lower than a specific gravity of the second metal material, and
 wherein the second member is disposed between the first member and the cell stacked body, and a vertical length of the second member is less than a height of the first member such that the second member presses a part of an adjacent one of the rectangular cells other than an upper end thereof.

2. The battery pack according to claim 1, wherein the second member is disposed between the first member and the cell stacked body.

3. The battery pack according to claim 1, wherein a thickness of the first member in the stacking direction of the plurality of rectangular cells is greater than a thickness of the second member in the stacking direction of the plurality of rectangular cells.

4. The battery pack according to claim 1, wherein the first member includes an engagement recess on a surface facing the second member, the second member being to be engaged with the engagement recess, and the second member is engaged with the engagement recess.

5. The battery pack according to claim 1, wherein the first member and the second member are pasted on and fixed to each other using an adhesive or a tape having adhesive layers on opposite surfaces.

6. The battery pack according to claim 5, wherein the first member includes a through hole, and the second member includes a through hole at a position facing the through hole in the first member.

7. The battery pack according to claim 1, wherein the first member is made of aluminum or an aluminum alloy, and the second member is made of iron or an iron alloy.

8. The battery pack according to claim 1, wherein the second member includes a reinforcing rib, and the reinforcing rib is formed by folding an end of the second member.

9. The battery pack according to claim 8, wherein the first member includes a recess, and the reinforcing rib is disposed in the recess.

10. The battery pack according to claim 9, wherein the reinforcing rib is disposed at at least one of an upper edge and a lower edge of the second member.

11. The battery pack according to claim 1, wherein the second member includes a fitting projection on a surface facing the first member,
   the first member includes a fitting recess on the surface facing the second member, and
   the fitting projection is disposed in the fitting recess.

12. The battery pack according to claim 1, wherein the connection member is fixed to the first member via a fixing component,
   the first member includes a first through hole into which the fixing component is inserted,
   the second member includes a second through hole on an extension of the first through hole, and
   a caulked portion of the fixing component is disposed inside the first through hole in the first member.

13. The battery pack according to claim 12, wherein the fixing component includes a rivet.

14. The battery pack according to claim 1, wherein
   the connection member is disposed on a side surface or an upper surface of the cell stacked body,
   the connection member includes a first fixing portion at the first end in the stacking direction of the plurality of rectangular cells, the first fixing portion being folded so as to follow an outer surface of the first end plate,
   the connection member includes a second fixing portion at the second end in the stacking direction of the plurality of rectangular cells, the second fixing portion being folded so as to follow an outer surface of the second end plate,
   the first fixing portion is fixed to the outer surface of the first end plate, and
   the second fixing portion is fixed to the outer surface of the second end plate.

15. A vehicle comprising the battery pack according to claim 1.

* * * * *